United States Patent [19]
Goolsbay et al.

[11] Patent Number: 5,695,538
[45] Date of Patent: Dec. 9, 1997

[54] FLEXIBLE PRESS AND METHOD OF USE

[75] Inventors: Dennis M. Goolsbay, Evansville; Larry W. Deffendoll, Boonville; Patrick L. Singleton, Wadesville, all of Ind.

[73] Assignee: PPG Industries, Inc., Pittsburgh, Pa.

[21] Appl. No.: 763,585

[22] Filed: Dec. 10, 1996

Related U.S. Application Data

[63] Continuation of Ser. No. 276,122, Jul. 15, 1994, abandoned.

[51] Int. Cl.⁶ .................................................. C03B 23/03
[52] U.S. Cl. .................... 65/106; 65/273; 65/287; 65/289; 65/291
[58] Field of Search .......................... 65/106, 93, 273, 65/287, 289, 290, 291

[56] References Cited

U.S. PATENT DOCUMENTS

| | | | |
|---|---|---|---|
| 3,106,464 | 10/1963 | Dammers | 65/291 |
| 3,367,764 | 2/1968 | Seymour . | |
| 3,459,526 | 8/1969 | Stickel et al. | 65/289 |
| 3,476,540 | 11/1969 | Ritter, Jr. et al. | 65/107 |
| 3,527,589 | 9/1970 | Ritter, Jr. et al. | 65/289 |
| 4,272,274 | 6/1981 | Frank et al. | 65/273 |
| 4,305,746 | 12/1981 | Hagedorn et al. | 65/287 |
| 4,579,577 | 4/1986 | Claassen | 65/273 |
| 4,741,751 | 5/1988 | Claassen et al. | 65/290 |
| 4,830,650 | 5/1989 | Kelly | 65/106 |
| 4,904,294 | 2/1990 | Schultz et al. . | |
| 5,401,286 | 3/1995 | Goolsbay et al. | 65/106 |

FOREIGN PATENT DOCUMENTS

626211  8/1961  Canada .

OTHER PUBLICATIONS

USSN 08/150,892, filed Nov. 12, 1993 entitled "Flexible Press Rail Support".

*Primary Examiner*—Steven P. Griffin
*Attorney, Agent, or Firm*—Andrew C. Siminerio

[57] ABSTRACT

A flexible ring mold for shaping heat softened glass sheets lifts a heat softened glass sheet and presses it against the shaping surface of an upper mold. Prior to the peripheral portions of the glass sheet contacting the upper mold, the flexible ring deforms to preliminarily shape the glass sheet.

17 Claims, 6 Drawing Sheets

FLEXIBLE PRESS AND METHOD OF USE

This application is a continuation of application Ser. No. 08/276,122, filed Jul. 15, 1994, now abandoned.

BACKGROUND OF THE INVENTION

This invention relates to shaping heat softened sheet material, and in particular to shaping heat softened glass sheets between an upper mold and a lower flexible ring mold.

Shaped and tempered glass sheets are widely used as windows in vehicles such as automobiles and the like. To fabricate these windows, flat glass sheets must be shaped to precisely defined curvatures dictated by the shape and outline of the window frame openings in the vehicle. It is important that the windows meet stringent optical requirements and be free of optical defects that would tend to interfere with clear viewing through the window. Any distortion in the shaping members that engage the heat softened sheet is replicated in the major surface of the sheet and result in an optically deficient surface on the shaped sheet.

Commercial production of shaped glass sheets commonly includes the steps of heating flat glass sheets to their softening temperature, shaping the heated sheets to a desired curvature and then cooling the shaped glass sheets in a controlled manner. In particular, the glass sheets are serially conveyed through a tunnel type furnace, heated to their heat deformation temperature and thereafter conveyed into a shaping station where the heat softened sheets are sandwiched between a pair of vertically, aligned upper and lower shaping molds. After shaping, the molds separate with the shaped glass sheet remaining secured to the upper mold by vacuum. A transfer ring, having an outline shape and conforming to the desired curvature of the glass sheet slightly inboard of its perimeter, moves beneath the upper mold which thereafter releases the vacuum and deposits the shaped glass sheet on the ring. The ring then transfers the shaped glass sheet into the cooling station for tempering.

The lower mold in such sheet shaping arrangement is generally positioned below the conveying rolls in the shaping station and may include a flexible shaping ring as disclosed in U.S. Pat. No. 4,830,650 to Kelly. During shaping, the lower mold moves upward and lifts the glass sheet off the conveying rolls and into engagement with the upper mold. The flexible ring presses the periphery of the glass sheet against a corresponding portions of the upper mold, conforming both the ring and glass to the shape of the upper mold.

It would be advantageous to provide an arrangement whereby the lower mold preliminarily shapes the glass sheet prior to the sheet being pressed against the shaping surface of the upper mold.

SUMMARY OF THE INVENTION

The present invention provides an apparatus and method for shaping heat softened sheet material including an upper mold, having a sheet shaping surface generally corresponding to the final desired contours of the sheet to be shaped, and a lower ring mold, with a flexible sheet engaging surface, vertically aligned below the upper mold. A plurality of deformable supports are positioned below the flexible surface to support the ring mold. The ring mold is configured such that its flexible surface engages and supports the sheet to be shaped about its periphery. As the ring mold lifts the glass sheet and moves it toward the upper mold, but prior to the periphery of the glass contacting the mold surface, the flexible sheet engaging surface of the ring mold progressively deforms to preliminarily shape the glass sheet. In one particular embodiment of the invention, a drive plate is positioned below the ring mold and a support ring is positioned between the ring mold and drive plate. The deformable supports include a plurality of members secured to the ring mold which extend slidably downwardly through the support ring and drive plate. A first stop is positioned along each of the members between the ring mold and support ring and a second stop is positioned along each of the members between the support ring and drive plate. As the support ring and drive plate move upward, the support ring engages the first stops and moves the ring mold and sheet toward the upper mold. Prior to the peripheral portion of the glass sheet contacting the upper mold, the movement of the support ring is stopped while the drive plate continues to move upward, engaging the second stops and progressively deforming the flexible shaping surface of the ring mold.

DETAILED DESCRIPTION OF THE INVENTION

The present invention is taught in conjunction with its use in shaping heat softened glass sheets, but it is understood that the invention may be used in any type of heat softened sheet material shaping arrangement which utilizes a flexible shaping member.

Figure 1:
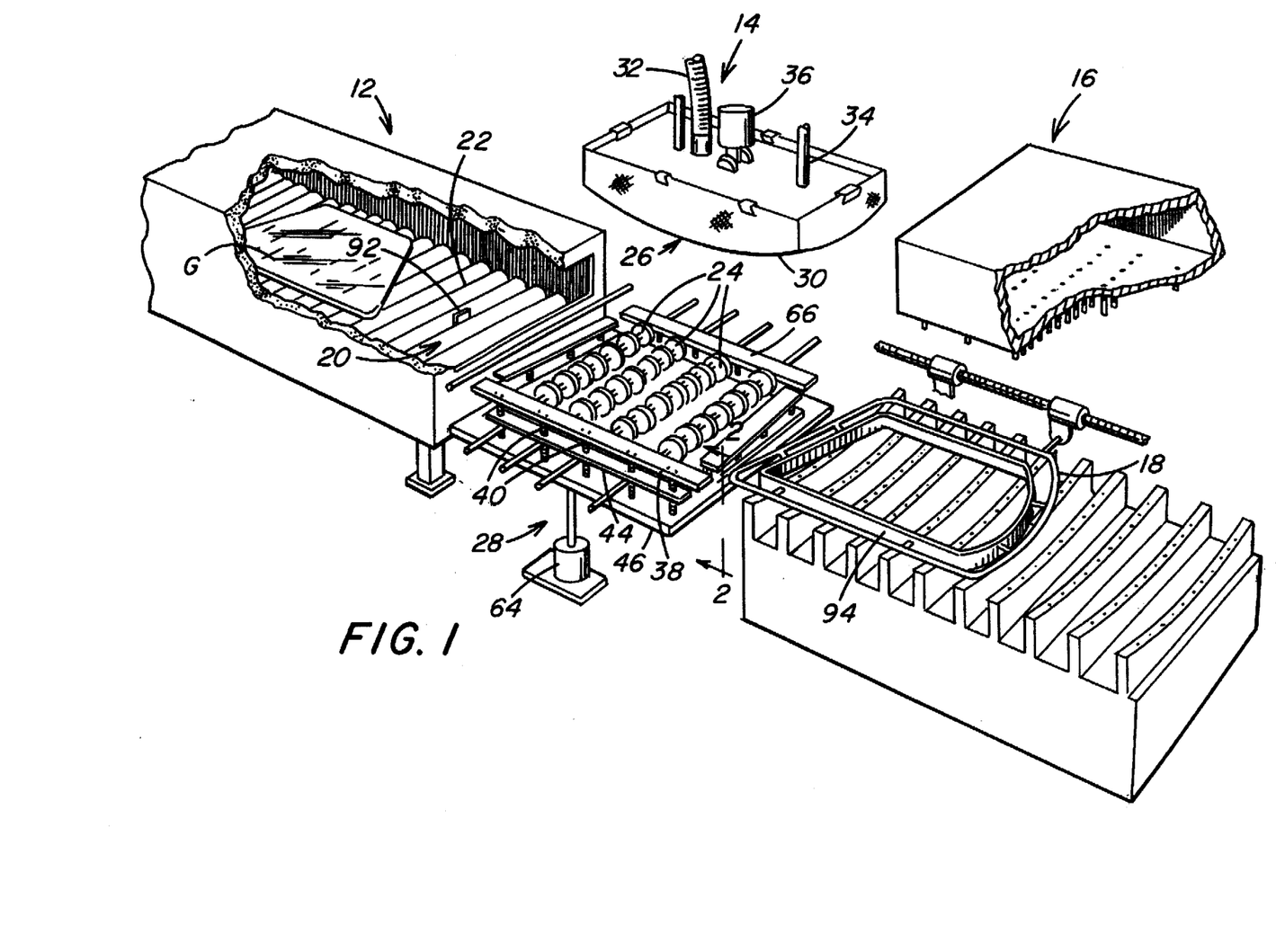
FIG. 1 is a partly fragmentary perspective view looking upstream at a glass sheet bending arrangement incorporating the teachings of the present invention.

Referring to FIG. 1, an apparatus for heating and shaping sheets of heat softened materials such as glass, includes a furnace 12 through which the glass sheets G are serially conveyed from a loading station (not shown) to heat each sheet to its deformation temperature, a shaping station 14 to shape the glass sheets, a cooling station 16 for cooling the shaped sheets, and an unloading zone (not shown) beyond the cooling station 16. Although not limiting in the present invention, the loading and unloading zones, furnace 12, shaping station 14 and cooling station 16 are aligned in an end to end relation. A sheet transfer means 18 located at the cooling station 16 transfers the glass sheet G between the shaping station 14 and cooling station 16.

The furnace 12 includes a horizontal conveyor 20 with longitudinally spaced, transversely extending conveyor rolls 22 that define a path of travel which extends through the furnace 12. The rolls 22 in the conveyor 20 are arranged in sections and their rotational speed is controlled through clutches (not shown) so that the speed of each conveyor section may be controlled and synchronized in any convenient manner.

The shaping station 14 includes a series of spaced apart, donut shaped support rolls 24, an upper shaping mold 26 and a lower shaping mold 28. Rolls 24 support the heat softened glass sheet G as it exits the furnace 12 and enters the shaping station 14. If desired, rolls 24 may be replaced with rolls (not shown) that provide for continuous transverse support of the sheet G within lower shaping mold 28. Although not limiting in the present invention, the upper mold 26 is a vacuum mold similar to that disclosed in U.S. Pat. No. 4,579,577. The contoured shaping surface 30 of the mold 26 conforms to the final desired shape of the glass sheet G. With continued reference to FIG. 1, the upper vacuum mold 26, which communicates with a vacuum source (not shown) through an evacuation pipe 32 and suitable valve means (not shown), is suitably connected through upper vertical guard rods 34 to a support frame (not shown) and is vertically moveable via a piston arrangement 36 relative to the frame. The evacuation pipe 32 may be connected through a suitable valve arrangement to a source of pressurized air (not shown). The valve for the vacuum line and for the pressure line may be synchronized according to a predetermined time cycle in any convenient manner.

Figure 2:
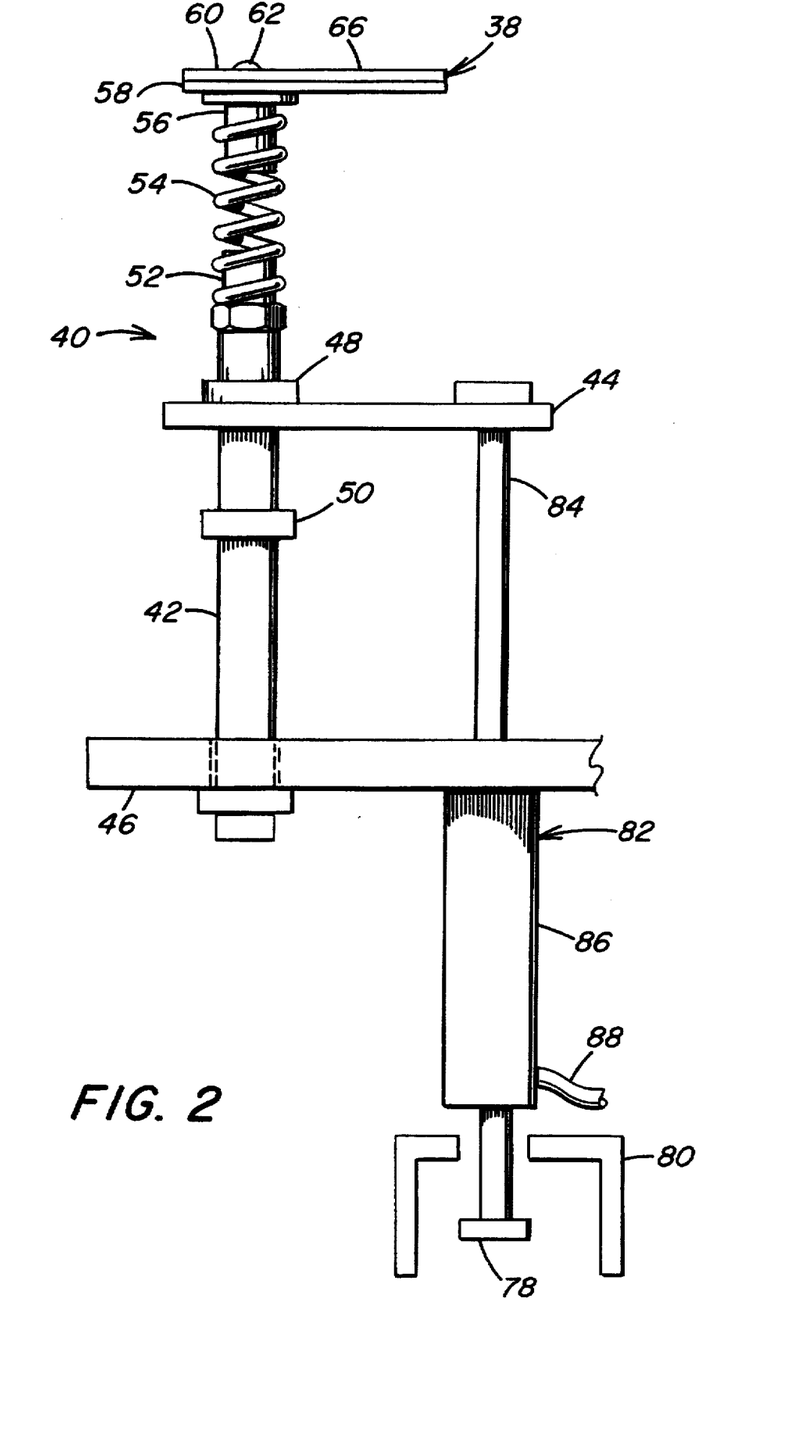
FIG. 2 is an sectional view through line 2—2 of FIG. 1 illustrating the flexible shaping ring, support ring and drive plate of the present invention, with portions removed for clarity.

The lower mold 28 is similar to that taught in U.S. Pat. No. 4,830,650 and includes a flexible ring 38 that is generally flat when initially engaging a heat softened glass sheet G and conforms to the peripheral curvature of the upper mold 26 during pressing as will be discussed later in more detail. Referring to FIG. 2, the flexible ring 38 includes a plurality of support assemblies 40 (only one shown in FIG. 2), each of which includes a support bar 42 which extends slidably through an upper support ring 44 and a lower drive plate 46. Each assembly 40 further includes an upper collar or stop 48 secured to an upper end of bar 42 such that each assembly 40 is supported by upper ring 44 by the collar 48, and a lower collar or stop 50 secured to bar 42 at a predetermined location between ring 44 and plate 46 to progressively bend ring 38 and the supported glass sheet G before the sheet is fully pressed against surface 30 of mold 26, as will be discussed later in more detail. A post 52 is secured to the upper end of each bar 42 in any convenient manner and includes a spiral groove along its surface to engage the lower end of a support spring 54. A post 56, which is similar to post 52, engages the upper end of support spring 54 and is secured to a flexible support 58 of ring 38 in any convenient manner. Heat resistant board 60 is secured to support 58, for example, by rivets 62 so that as the support 58 and board 60 flex during pressing, they may slide relative to each other.

Support assembly 40 allows the flexible ring 38 to engage and conform to the shaping surface 30 of the upper mold 26 by allowing for translational and rotational movement of the flexible sheet engaging surface. More particularly, support spring 54 operates as a universal joint, i.e. it allows flexible ring 38 to pivot about any axis and adjust to shaping surface 30 of the upper mold. Although not limiting in the present invention, the spring constant for the support spring 54 may vary between 50–150 lbs. per inch (8.95–26.84 kilograms per cm.).

The combination of support 58 and board 60 which form ring 38 should be sufficiently rigid to support the heat softened glass sheet G as it is engaged by the lower mold 28, but also sufficiently flexible to deform during lifting of the ring 38, as will be discussed later, and conform to the peripheral configuration of the upper mold 26. In one particular embodiment of the invention, support 58 is 0.030 inch (0.76 mm) spring steel and board 60 is 0.125 inch (3.18 mm) thick Spauldite® ARK-2 aramid laminate available from Spaulding Fibre Co., Inc., New York. If desired, additional heat resistant materials, such as fiberglass or metal press cloth (not shown), may be used to cover the ring 38.

Lower plate 46 is secured to an elevator means, which is shown in FIG. 1 as lifting cylinder 64, to vertically reciprocate flexible ring 38 from an initial position, wherein the sheet engaging surface 66 of the flexible ring 38 is positioned below the support rolls 24 in the shaping station 14, to a second position above the support rolls 24 to shape the glass sheet, as will be discussed later.

If desired, to prevent the ring 38 from deforming during its initial upward movement, which is due in part to the compression of springs 54 as they support the weight of the flexible ring 38 and glass sheet G, lower mold 28 may be provided with an assembly as disclosed in U.S. Pat. No. 5,401,286 which includes a plurality of posts which support ring 38 during the initial lifting of the glass sheet G and prevent undesired deformation.

In one embodiment of the invention, ring 44 is biased in spaced apart relation from plate 46 by double rod air cylinder 82 as shown in FIGS. 2–8 which are available from Bimba Manufacture Co., Monee, Ill. One end of rod 84 of cylinder 82 is fixed to ring 44 and bottom section 86 of cylinder 82 is fixed to lower plate 46. Collar 78 is secured to the opposite end of rod 84 below section 86 and is positioned to contact stop 80, which is secured to the shaping station frame (not shown), during the glass sheet shaping operation, as will be discussed later in more detail. Air is supplied to cylinder 82 through supply line 88 (shown only in FIG. 2) to maintain the spacing between ring 44 and plate 46 during the initial lifting of the glass sheet G during shaping. More specifically, the pressure in cylinder 82 is maintained so as to keep rod 84 fully extended during the initial lifting of the glass. Continued pressurization of cylinder 82 also ensures continued contact between ring 44 and several of the collars 48 during the initial lifting and preliminary deforming of the ring 38 and the glass sheet G. In one embodiment of the invention, four cylinders 82 are used to space ring 44 from plate 46, one at each corner of plate 46. With this configuration, cylinders 82 also operate as alignment devices to maintain the desired orientation of ring 44 relative to plate 46.

Figure 3:
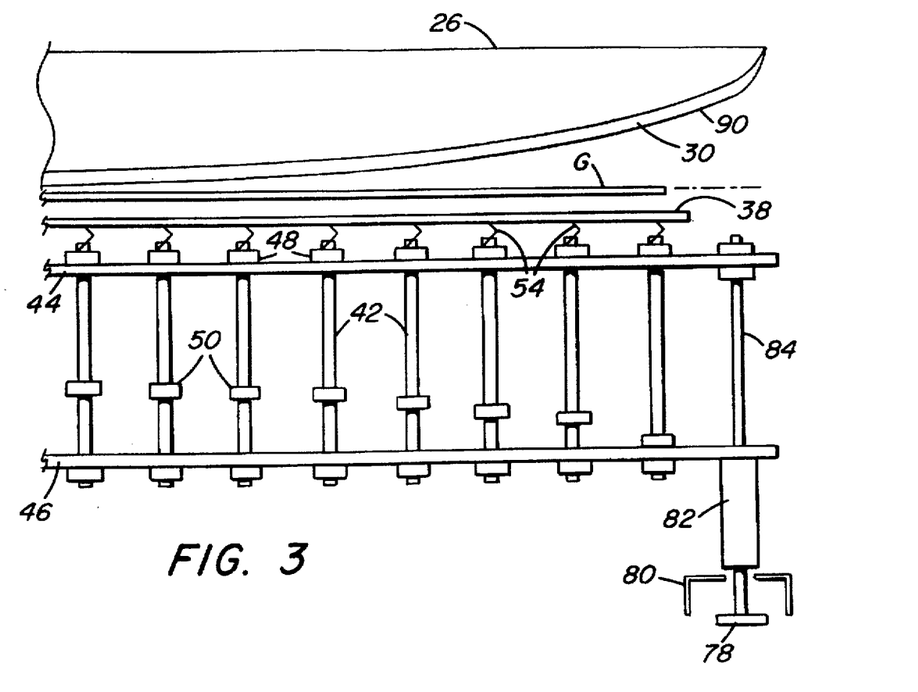
FIGS. 3–9 are schematic elevational views illustrating the operation of the flexible ring shaping arrangement of the present invention.
Figure 4:
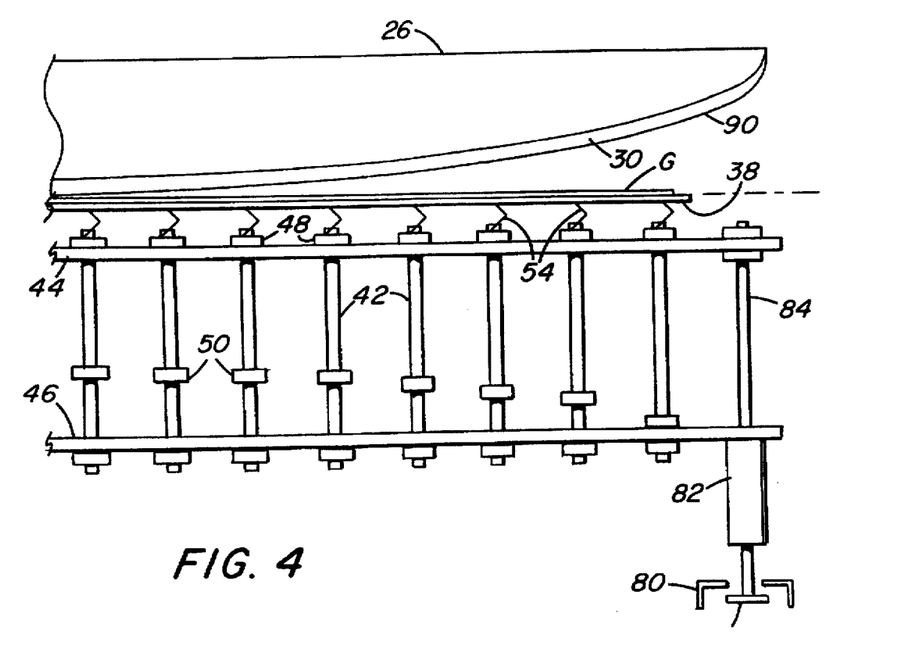
Figure 5:
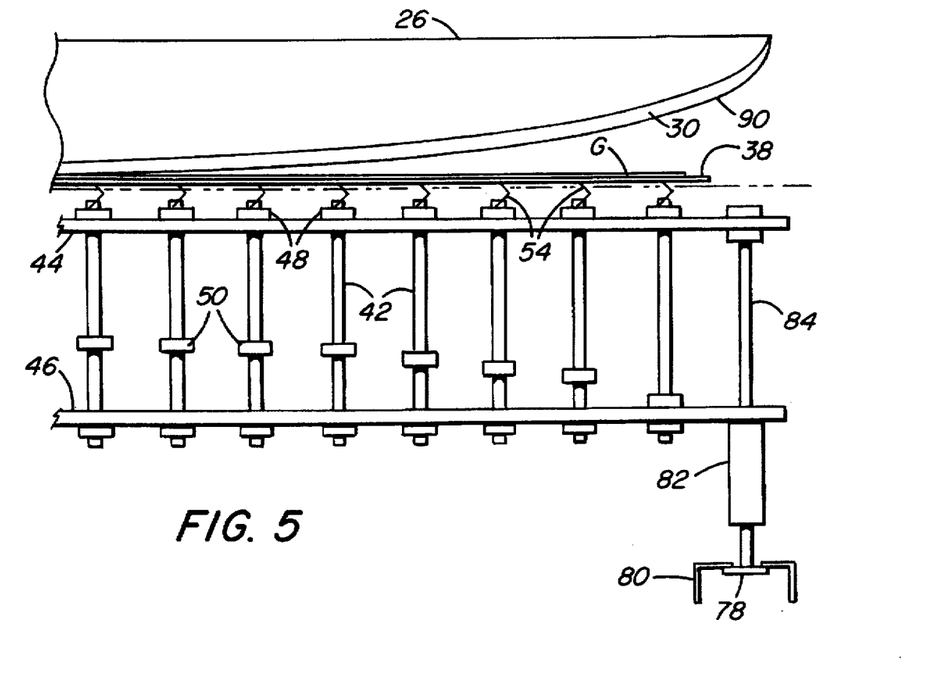

Referring to FIGS. 1 and 3–9, in operation the glass sheet G is conveyed through the furnace 12 to heat the sheet G to its heat softening temperature. Sensor 92 senses the position of the glass sheet G and sends this information to a controller (not shown) which controls the conveying rates of rolls 22 in furnace 12 and rolls 24 in shaping station 14 (rolls 24 are shown only in FIG. 1). As the glass sheet G exits the furnace 12 and is conveyed to shaping station 14, the flexible ring 38 of the lower mold 28 is positioned below the upper conveying surface of the support rolls 24 so that the glass sheet G may be conveyed therethrough without interference as shown in FIG. 3. When the glass sheet G is in proper position between the upper mold 26 and the lower mold 28, cylinder 64 (shown only in FIG. 1) is activated to move lower mold 28 upward to contact the glass sheet G as shown in FIG. 4, and lift the glass sheet off rolls 24 as shown in FIG. 5.

Referring to FIGS. 3–5, as cylinder 64 moves mold 28 upward, cylinder 82 also moves upward with collar 78 approaching stop 80. The upward movement of flexible ring 38 by support ring 44 is limited by the collar 78 contacting stop 80 as shown in FIG. 5. Although not limiting in the present invention, in the embodiment of the invention illustrated in FIG. 5, collar 78 and stop 80 are positioned to prevent further vertical movement of ring 44 prior to the peripheral portion of the glass sheet G being pressed against a corresponding peripheral portion of surface 30 of upper mold 26. More particularly, collar 78 and stop 80 are positioned such that ring 44 is stopped as the central portions of the glass sheet G initially contact corresponding central portions 90 of surface 30 of upper mold 26 but prior to the peripheral portions of the glass sheet G contacting upper mold surface 30. In this particular embodiment, at this point in the shaping operation, support ring 44 is still supporting each of the assemblies 40 via collars 48. However, if desired, one or more of stops 50 may be positioned along bars 42 of assemblies 40 such that drive plate 46 engages those stops 50 and begins to lift the respective assembly 40 and deform ring 38 and supported glass sheet G before collar 78 contacts stop 80.

During the upward movement of plate 46 by cylinder 64, plate 46 slides along rod 84 of double rod air cylinder 82. The pressure in cylinders 82 is maintained to keep ring 44 and plate 46 positively biased apart but not so great as to prevent the continued upward movement of plate 46 by cylinder 64 after collar 78 contacts stop 80. If desired, since stops 80 prevent any additional upward movement by ring 44, pressure in cylinder 82 may be terminated. It should be appreciated that the cylinders 82 may be replace by springs (not shown) having a stiffness that is sufficient to maintain the desired biasing force between ring 44 and plate 46 but, may be compressed by cylinder 64 during the further pressing of the glass sheet G.

Figure 6:
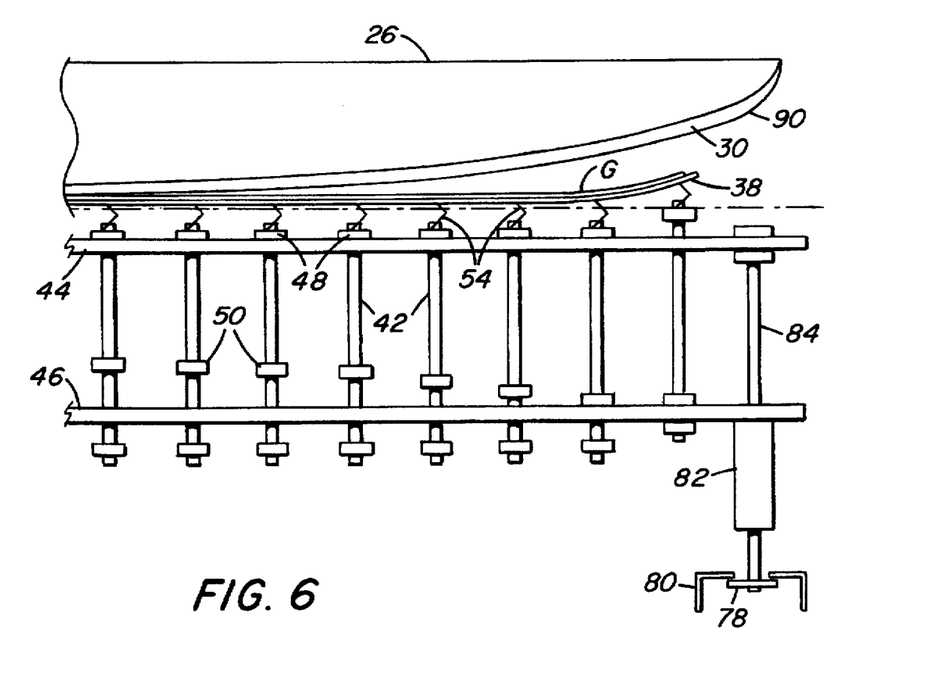
Figure 7:
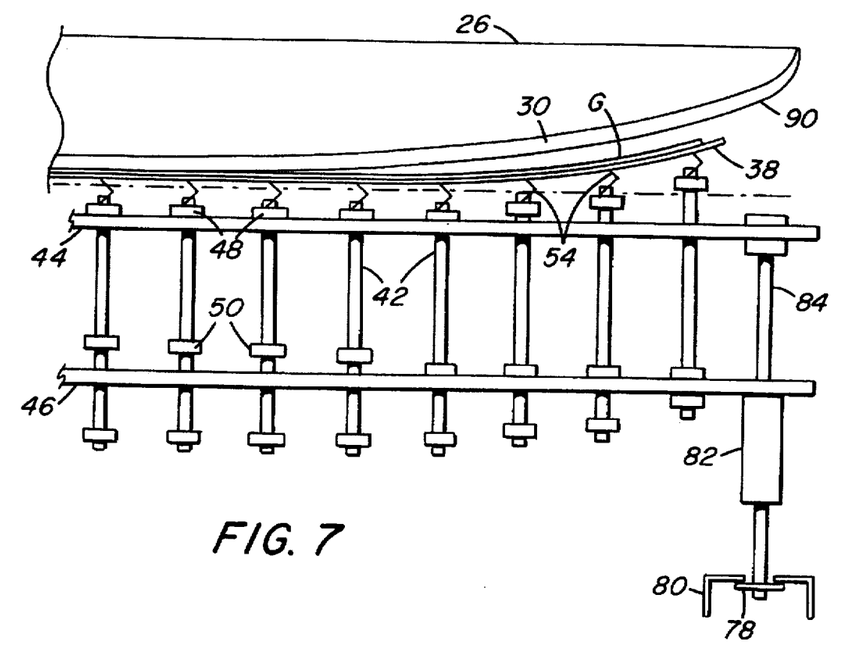
Figure 8:
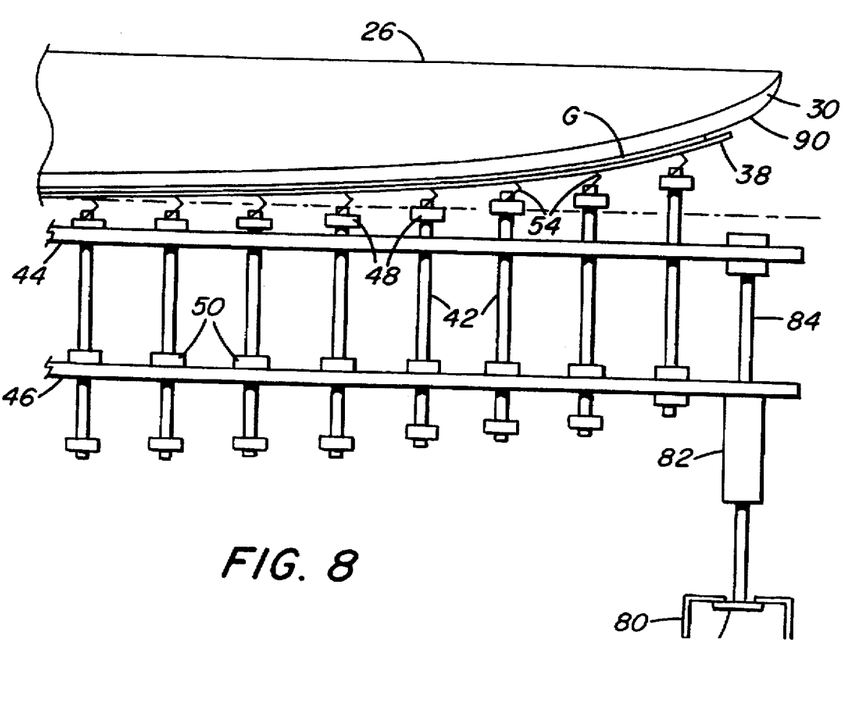
Figure 9:
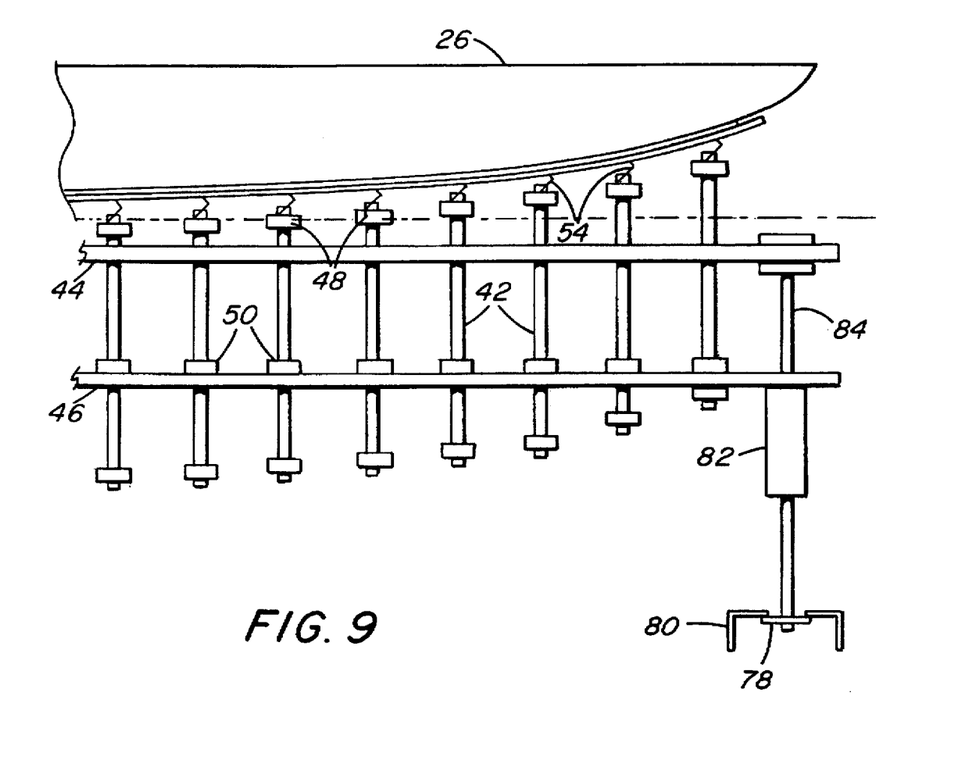

Referring to FIGS. 6 and 7, as cylinder 64 continues to lift drive plate 46, further upward movement of support ring 44 is prevented and drive plate 46 continues its upward movement along rods 42 of the assemblies 40. As plate 46 contacts collars 50, in succession from right to left as viewed in FIGS. 3–9, plate 46 lifts each assembly 40 and which in turn begins to progressively deform a corresponding portion of the flexible ring 38. Collars 50 are positioned along bars 42 such that when all the collars 50 are engaged by lower plate 46, the ring 38 approximates the contoured configuration of the periphery of the upper mold 26 as shown in FIG. 8. At this stage of the shaping operation, at least the periphery of the glass sheet G has a shaped configuration that approximates the final desired shape for that portion of the sheet. Cylinder 64 continues to move lower plate 46 upward, lifting all the assemblies 40 via stops 50 off the upper ring 44 and completing the pressing of the glass sheet G as shown in FIG. 9. More particularly, glass sheet G which is supported by flexible ring 38, is pressed against surface 30 of upper mold 26. Springs 54 rotate and compress allowing the flexible ring 38 to pivot and deform to a configuration complimenting the corresponding peripheral portion of the mold 26. Vacuum is drawn along surface 30 during the pressing operation to further shape the interior portions of the glass sheet G and hold the sheet G against the mold 26 after shaping.

After shaping, cylinder 64 lowers lower mold 28 and the shaped glass sheet G is held against the upper mold 26 by vacuum. Sheet transfer means 18, such as a tempering ring 94 is then positioned beneath the upper vacuum mold 26 to receive the shaped glass sheet G. The vacuum is then terminated and the glass sheet G is deposited on the tempering ring 94 which thereafter conveys the shaped glass sheet G to the cooling station 16 where the glass sheet G is controllably cooled to a temperature below its strain point temperature to temper the glass.

In an alternate embodiment of the invention, the glass sheet G may be preliminarily deformed without using upper collars 48 on lower mold 28. More particularly, with collars 48 removed from bars 42, as the drive plate 46 moves upward and sequentially engages collars 50, the ring 38 will deform either prior to or simultaneously with lifting the glass sheet G off of rolls 24 to shape the glass sheet G prior to it being pressed against surface 30 of upper mold 26.

Other variations as would be known to those skilled in the art based on the disclosure herein may be resorted to without departing from the scope of the invention as defined by the claims that follow.

We claim:
1. An apparatus for shaping heat softened sheet material comprising:
   an upper mold having a sheet shaping surface generally corresponding to the final desired contours of a sheet to be shaped;
   a lower press assembly vertically aligned below said upper mold, said lower press assembly having:
   a ring mold with a flexible sheet engaging surface;
   a drive plate positioned below said ring mold;
   a support ring positioned between said ring mold and said drive plate; and
   a plurality of deformable supports positioned below said flexible sheet engaging surface to support said ring mold, said deformable supports each being secured to said ring mold and having a member which extends downwardly and contacts said support ring and drive plate, a first stop positioned along said member between said ring mold and support ring, and a second stop positioned along said member between said support ring and drive plate; and
   means to move said lower press assembly from a first position, wherein said ring mold is spaced below said sheet and said support ring contacts said first stops, to a second position, wherein said ring mold engages said sheet about its periphery while said support ring maintains contact with said first stops, to a third position, wherein portions of said sheet are in close proximity to said upper mold, to a fourth position, wherein said drive plate engages said second stops and lifts said first stops off said support ring, deforms said flexible sheet engaging surface of said ring mold and preliminarily shapes said sheet by moving said periphery of said sheet into close proximity with and spaced from said upper mold, to a fifth position, wherein said drive plate maintains contact with said second stops to press said periphery of said sheet against said upper mold.

2. The apparatus of claim 1 wherein said members extend slidably downwardly through said support ring and drive plate.

3. An apparatus for shaping heat softened sheet material comprising:
   an upper mold having a sheet shaping surface generally corresponding to the final desired contours of a sheet to be shaped;
   a lower ring mold vertically aligned below said upper mold, said ring mold having a flexible sheet engaging surface;
   a drive plate positioned below said ring mold;
   a support ring positioned between said ring mold and said drive plate;
   a plurality of deformable supports positioned below said flexible sheet engaging surface of said ring mold to support said ring mold, said deformable supports being secured to said ring mold and extending slidably downwardly and contacting said support ring and drive plate;
   means to engage said sheet to be shaped with said ring mold such that said flexible sheet engaging surface of said ring mold supports said sheet about its periphery and positions said sheet periphery in close proximity to said upper mold sheet shaping surface;
   means to move said upper mold and ring mold relative to each other to contact said sheet with said upper mold sheet shaping surface and press said sheet between said upper mold sheet shaping surface and said flexible sheet engaging surface of said ring mold; and
   means to deform said flexible sheet engaging surface of said ring mold prior to said periphery of said sheet contacting said upper mold sheet shaping surface.

4. The apparatus as in claim 3 wherein said deforming means includes means to progressively deform said flexible sheet engaging surface of said ring mold prior to said periphery of said sheet contacting said upper mold sheet shaping surface.

5. The apparatus as in claim 4 wherein said progressive deforming means includes a stop positioned along each of said deformable supports between said support ring and drive plate, and said engaging means further includes means to lift said drive plate to engage said stops and progressively deform said flexible sheet engaging surface of said ring mold.

6. The apparatus as in claim 4 wherein said progressive deforming means includes a first stop positioned along each of said deformable supports between said ring mold and support ring and a second stop positioned along each of said deformable supports between said support ring and drive plate, and said enagaging means further includes means to initially lift said support ring to engage said first stops and move said ring mold and sheet into close proximity with said sheet shaping surface of said upper mold, and means to subsequently lift said drive plate so as to engage said second stops and progressively deform said flexible sheet engaging surface of said ring mold prior to said periphery of said sheet contacting said upper mold sheet shaping surface.

7. The apparatus as in claim 6 further including means to exert a biasing apart force between said support ring and drive plate.

8. The apparatus as in claim 6 further including means to draw a vacuum along said upper mold sheet shaping surface.

9. The apparatus as in claim 8 further including a tempering ring and means to move said tempering ring between a first position beneath said upper mold to a second position spaced from said upper mold.

10. The apparatus as in claim 9 wherein said deformable supports include a plurality of spring members secured to said ring mold wherein said spring members allow translational and rotational movement of said flexible sheet engaging surface.

11. The apparatus of claim 3 wherein said plurality of deformable supports extend slidably downwardly through said support ring and drive plate.

12. A method of shaping heat softened sheet material comprising:

positioning a ring mold having a flexible sheet engaging surface, a drive plate and a support ring relative to each other such that said support ring and said drive plate are below said ring mold and said support ring is between said ring mold and said drive plate;

securing a plurality of members to said ring mold and extending said members slidably downwardly and contacting said support ring and drive plate;

providing each of said members with a stop positioned between said support ring and drive plate;

engaging peripheral portions of a sheet to be shaped with said flexible sheet engaging surface of said ring mold;

moving said ring mold and sheet toward an upper shaping mold having a contoured shaping surface generally corresponding to a final desired shape of said sheet such that portions of said peripheral portions of said sheet are in close proximity to corresponding peripheral portions of said contoured shaping surface of said upper mold;

lifting said drive plate to engage said stops and progressively deform said flexible sheet engaging surface of said ring mold and said sheet prior to said peripheral portions of said sheet contacting said corresponding peripheral portions of said contoured shaping surface of said upper mold; and pressing said sheet against said contoured shaping surface of said upper shaping mold while further deforming said flexible sheet engaging surface of said ring mold to conform to said corresponding peripheral portions of said contoured shaping surface of said upper mold.

13. The method as in claim 12 further including the steps of drawing a vacuum along said contoured shaping surface of said upper shaping mold during at least a portion of said pressing step to hold said sheet against said contoured shaping surface, lowering said ring mold while holding said sheet against said contoured shaping surface, positioning a tempering ring below said sheet, discontinuing said vacuum to deposit said sheet onto said tempering ring and moving said tempering ring and sheet to a location removed from said upper shaping mold to controllably cool said sheet.

14. The method of claim 12 wherein said members extend slidably downwardly through said support ring and drive plate.

15. A method of shaping heat softened sheet material comprising:

positioning a ring mold having a flexible sheet engaging surface, a drive plate and a support ring relative to each other such that said support ring and said drive plate are below said ring mold and said support ring is between said ring mold and said drive plate;

securing a plurality of members to said ring mold and extending said members slidably downwardly and contacting said support ring and drive plate;

providing each of said members with a first stop positioned between said ring mold and support ring and a second stop positioned between said support ring and drive plate;

engaging peripheral portions of a sheet to be shaped with said flexible sheet engaging surface of said ring mold;

moving said ring mold and sheet toward an upper shaping mold having a contoured shaping surface generally corresponding to a final desired shape of said sheet such that portions of said sheet are in close proximity to said contoured shaping surface of said upper shaping mold;

initially lifting said support ring to engage said first stops and move said ring mold and sheet toward said upper shaping mold such that portions of said sheet are in close proximity to said contoured shaping surface;

subsequently continuing said lifting step while limiting further lifting of said support ring, to engage said second stops with said drive plate and progressively deform said flexible sheet engaging surface of said ring mold and said sheet; and pressing said sheet against said contoured shaping surface of said upper shaping mold while further deforming said flexible sheet engaging surface of said ring mold to conform to corresponding peripheral portions of said upper shaping mold.

16. The method as in claim 15 further including the steps of drawing a vacuum along said contoured shaping surface of said upper shading mold during at least a portion of said pressing step to hold said sheet against said contoured shaping surface, lowering said ring mold while holding said sheet against said contoured shaping surface, positioning a tempering ring below said sheet, discontinuing said vacuum to deposit said sheet onto said tempering ring and moving said tempering ring and sheet to a location removed from said upper shaping mold to controllably cool said sheet.

17. The method of claim 15 wherein said members extend slidably downwardly through said support ring and drive plate.

* * * * *

UNITED STATES PATENT AND TRADEMARK OFFICE
CERTIFICATE OF CORRECTION

PATENT NO. : 5,695,538
DATED : December 9, 1997
INVENTOR(S) : Goolsbay et al.

It is certified that error appears in the above-identified patent and that said Letters Patent is hereby corrected as shown below:

Column 8, line 55, please delete "shading" and insert --shaping--.

Signed and Sealed this

Fifteenth Day of September, 1998

Attest:

BRUCE LEHMAN

*Attesting Officer*    *Commissioner of Patents and Trademarks*